United States Patent [19]
Peck

[11] 3,772,119
[45] Nov. 13, 1973

[54] METHOD FOR MAKING MONOFILAMENT FIBER OPTIC RIBBONS FOR COHERENT FIBERSCOPES

[75] Inventor: William F. Peck, Sturbridge, Mass.

[73] Assignee: American Optical Corporation, Southbridge, Mass.

[22] Filed: Oct. 22, 1970

[21] Appl. No.: 83,199

Related U.S. Application Data

[62] Division of Ser. No. 824,764, May 15, 1969, Pat. No. 3,607,560.

[52] U.S. Cl. .................. 156/173, 156/174, 156/175
[51] Int. Cl. ............................................. B65h 81/00
[58] Field of Search .................. 156/169, 173, 174, 156/175, 180, 433, 446, 447; 242/7.19; 350/96 B

[56] References Cited
UNITED STATES PATENTS

| | | | |
|---|---|---|---|
| 3,514,351 | 5/1970 | Mukai | 156/175 |
| 3,033,731 | 5/1962 | Cole | 156/175 |
| 3,486,962 | 12/1969 | Gallagher | 156/441 |
| 3,215,029 | 11/1965 | Woodcock | 156/174 |

Primary Examiner—Daniel J. Fritsch
Attorney—William C. Nealon et al.

[57] ABSTRACT

Monofilament optical fiber ribbons are formed by winding fiber convolutions one over another throughout a short section of the length of each ribbon, bringing the convolutions into accurately superimposed parallel relationship in said section of the ribbon and cementing across the section to hold same intact for assemblying and cementing together corresponding sections of a number of the ribbons as a fiberscope body.

4 Claims, 7 Drawing Figures

Patented Nov. 13, 1973
3,772,119
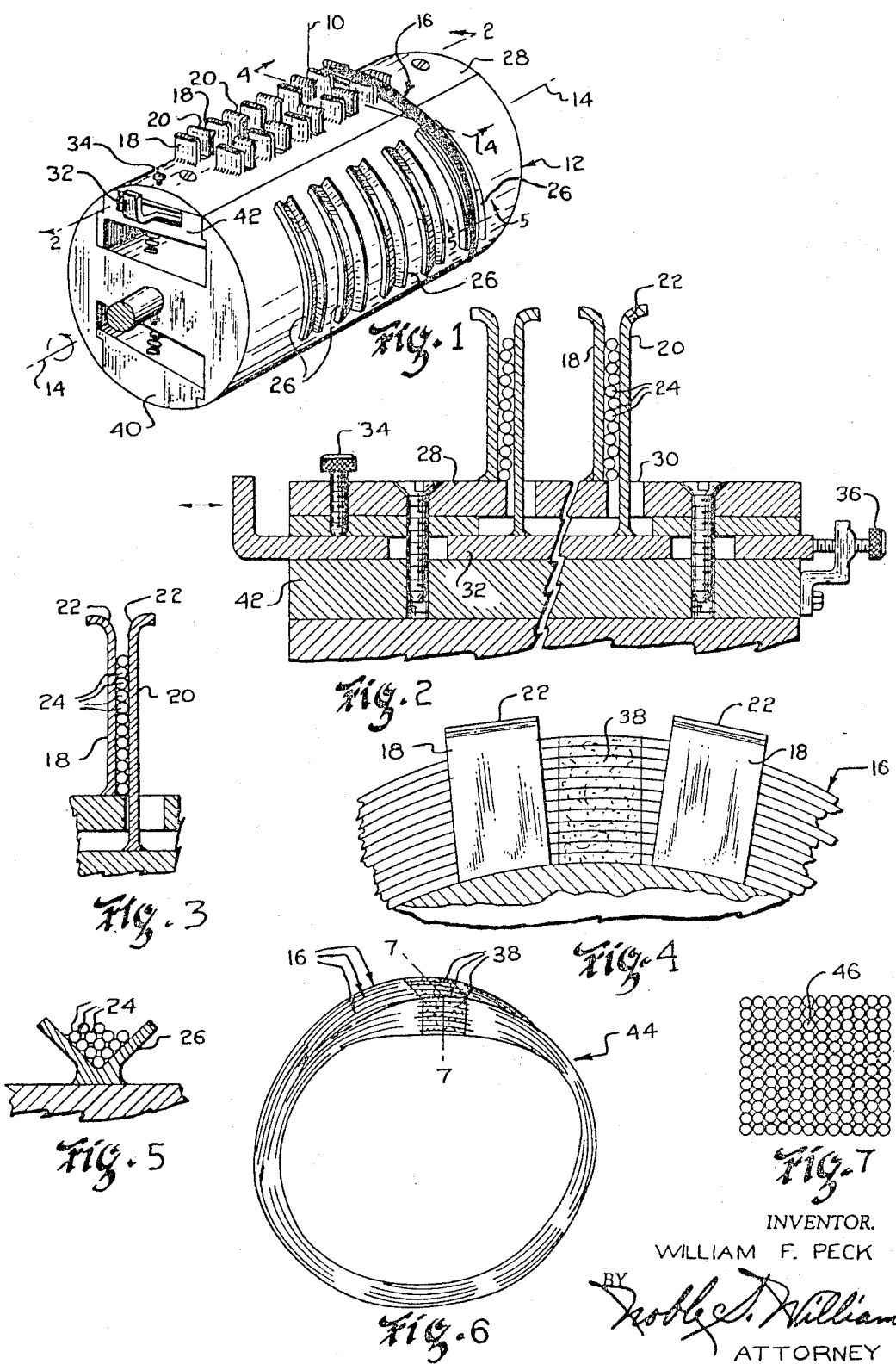
INVENTOR.
WILLIAM F. PECK
BY
Noble J. Williams
ATTORNEY 3,772,119

1

METHOD FOR MAKING MONOFILAMENT FIBER OPTIC RIBBONS FOR COHERENT FIBERSCOPES

This is a division of U.S. Pat. application Ser. No. 824,764 filed May 15, 1969, now U.S. Pat. No. 3,607,560.

BACKGROUND OF THE INVENTION

1. Field of the Invention

Fiber optics, with particular reference to improvements in method and apparatus for making monofilament ribbons used in the construction of fiberscopes.

2. Description of the Prior Art

A requisite to optimum performance in an image transmitting fiberscope is that opposite ends of corresponding fibers of the structure be identically geometrically patterned.

Early attempts to produce identically geometrically patterned fiberscope end faces involved the stacking of long fiber ribbons one over another with their opposite ends aligned as accurately as possible, e.g. as shown and described in U.S. Pat. NO. 3,104,191. This technique, in proving to be tedious, somewhat difficult to perform and not particularly well suited for production line manufacturing has, in many cases, been abandoned in favor of a more recently developed technique exemplified by U.S. Pat. No. 3,033,731.

The latter technique involving the forming of fiberscopes of a number of superimposed endless ribbons, eased the problem of achieving better geometrically patterned opposite end faces by forming such faces with a single cut made transversely through the stack of endless ribbons. The ribbons, however, each being in the form of a closely packed helix with their convolutions having a pitch of one fiber diameter or slightly greater makes it necessary to give considerable attention to the stacking of the ribbons so as to assure that the direction of helix angle in each ribbon matches that of its adjoining ribbons. Otherwise, as it is well-known to the artisan, alternate ribbons or layers of fibers having mismatched helix angles, i.e., one directed oppositely of the other, will produce inferior ground and polished image receiving and emitting faces of a fiberscope formed by the single cut technique of U.S. Pat. No. 3,033,731.

The present invention overcomes the problems of having to deal with helix angle alignment during the assembly of fiberscope structures and further eliminates difficulties heretofore experienced in producing closely packed fiber helices wherein the not uncommon occurences of overriding convolutions and/or excessive spacing between convolutions require that tedious and difficult hand packing operations be employed to render the fiber ribbons useful.

SUMMARY OF THE INVENTION

According to the present invention, an endless fiber ribbon is wound with its convolutions placed one over another throughout a short section of the length of the ribbon. The convolutions are then brought, all at once, into accurately aligned superimposed relationship with each other throughout the short section of the ribbon and cemented together to hold the ribbon intact for subsequent assembly with other similar ribbons of a fiberscope structure. Remaining lengths of fiber in the endless ribbon, which ultimately form the intermediate flexible section of the fiberscope and do not require alignment with each other, are permitted to randomly assume a closely packed relationship with each other whereby prior art problems of having to deal with intricate pitch control or level winding mechanisms are avoided. Furthermore, with endless ribbons formed according to the present inventive concept, a fiberscope assembly may be formed simply by cementing the ribbons together in side-by-side relationship with each other without the usual concern of helix angle alignment or that of having to fit the endless ribbons one within the other.

The foregoing and other advantages of the present invention will become more readily apparent from the following detailed description when taken with the accompanying drawing.

DESCRIPTION OF THE DRAWING

FIG. 1 diagrammatically illustrates, in perspective, a technique and apparatus useful in forming endless ribbons of fiber according to principles of the present invention;

FIG. 2 is an enlarged fragmentary cross-sectional view taken generally along line 2—2 of FIG. 1;

FIG. 3 illustrates in cross section a segment of the apparatus shown in FIG. 2 wherein an aligning step in the present ribbon forming technique is illustrated;

FIG. 4 is an enlarged fragmentary cross-sectional view taken generally along line 4—4 of FIG. 1;

FIG. 5 is an enlarged cross-sectional view taken generally along line 5—5 of FIG. 1;

FIG. 6 is an illustration, in perspective, of an assembly of a plurality of the subject fiber ribbons from which a fiberscope may be produced by cutting transversely through the bundle; and FIG. 7 is a plan view of a fiberscope face produced by cutting through the assembly of FIG. 6 along line 7—7.

DESCRIPTION OF THE PREFERRED EMBODIMENTS

In FIGS. 1–5 there is illustrated a technique and parts of apparatus pertinent to the manufacture of endless monofilament fiber ribbons according to principles of this invention.

Referring more particularly to FIG. 1, it will be seen that a drawn optical fiber 10 is wound upon drum 12 by rotation of the drum about its axis 14 to form endless ribbon 16.

Fiber 10 is preferably of the conventional light-conducting type having a core of high refractive index light-conducting material clad with a material of lower refractive index so that light entering one end of a length of the fiber will be transmitted to its opposite end by the principles of total internal reflection. Whether formed of glass or suitable plastic materials, fiber 10 is exceptionally flexible and readily adaptable to winding about drum 12. Those interested in greater details concerning the making of optical fibers such as fiber 10 and their function as light transmitting devices may refer to U.S. Pat. No. 3,033,731.

Drum 12 upon which fiber 10 is wound is provided with a series of alternately fixed and adjustable fiber stacking plates 18 and 20 respectively. Plates 18 and 20 are aligned in spaced double rows along the length of drum 12 and corresponding pairs of plates 18 and 20 in the double rows are aligned across drum 12 so as to receive, with each revolution of the drum, a convolution of fiber 10 between plates 18 and 20 of each aligned pair thereof when fiber 10 is fed to the drum as illustrated in FIG. 1.

Prior to the winding of a ribbon 16 or a number of such ribbons on drum 12, plates 18 and 20 are set a distance apart preferably greater than one diameter of the fiber 10 but less than twice the diameter of fiber 10 so that, with each revolution of drum 12, a convolution of fiber 10 will freely enter the space between plates 18 and 20 and seat itself against the surface of drum 12 or against a previously formed convolution of the fiber. The spacing between plates 18 and 20 being less than two fiber diameters prevents one convolution of fiber 10 from slipping below another. Outwardly FIG. 1 upper ends 22 of the plates guide the convolutions into the space therebetween. traversing By winding fiber 10 between corresponding pairs of plates 18 and 20 and around the remaining body portion of drum 12, convolutions 24 of fiber 10 become stacked one over the other between plates 18 and 20 substantially as shown in FIG. 2 and are randomly bundled together throughout the remaining portions of their lengths as illustrated in FIGS.1 and 5. V-shaped fiber gathering troughs 26 are positioned in line with corresponding pairs of plates 18 and 20 at each of opposite sides of the plates (i.e., the side of drum 12, not shown, is identical to the side thereof shown in FIG. 1). Troughs 26 hold the bundled portions of the fiber convolutions in line with portions of the convolutions transversing the space between plates 18 and 20.

Referring more particularly to FIG. 2, it can be seen that plates 18 are welded or otherwise fixed to a segment 26 of the drum winding surface while plates 20 extend through openings 30 in segment 28 into attached relationship with a slide 32 located beneath segment 28 in the drum. Slide 32 is adjustable longitudinally of drum 12 so that all plates 20 may be moved toward and away from their respectively adjacent plates 18. Set screw 34 is used to lock slide 32 in desired positions of adjustment. Adjustable stop 36 is normally set to limit the extent of movement of plates 20 in a direction away from plates 18, to an amount less than two diameters of fiber 10.

With slide 32 positioned against stop 36 and locked by screw 34 the above-described winding of endless ribbon 16 is effected simply by positioning the feed of fiber 10 in line with a selected set of aligned pairs of plates 18 and 20 and rotating drum 12 about its axis 14.

Following the formation of a desired number of stacked convolutions 24, rotation of drum 12 is stopped, set screw 34 is loosened and slide 32 is drawn toward plates 18 to tighten the stack of fiber convolutions therebetween and bring them into accurately superimposed relationship with each other as illustrated in FIG. 3. At this point, set screw 34 is again tightened so as to retain the aligned relationship of convolutions 24 and a coating of a suitable cement or other bonding material 38 (FIG. 4) is brushed or otherwise applied across one or both sides of the stack of fiber convolutions between pairs of plates 18 and 20.

After allowing sufficient time for cement 38 to thoroughly set or dry, ribbon 16 is released from its clamped relationship between plates 18 and 20 by loosening set screw 34 and moving slide 32 back against stop 36. The cemented ribbon 16 is removed from drum 12 by retracting segment 40 into drum 12 (FIG. 1), lifting convolutions 24 out of troughs 26, moving the same to a space between the troughs and lifting the stacked portion of convolutions 24 out of the space between plates 18 and 20. The ribbon is worked toward one end of drum 12 and removed therefrom. Block 42 which supports slide 32 and segment 28 may also be retracted into drum 12 to facilitate the removal of ribbons 16 or the entire unit of block 42, slide 32 and segment 28 may be slide longitudinally out of drum 12 to carry with it the fiber ribbons 16 which may then be conveniently lifted out of stacking plates 18 and 20.

It should be understood that a number of endless ribbons 16 corresponding to the number of dual pairs of stacking plates 18 and 20 may be formed one after another with a single winding operation by leading the feed fiber 10 across drum 12 to successive ribbon winding positions. The length of fiber 10 transversing drum 12 between pairs of stacking plates is cut after the cementing of all fiber ribbons so as to separate the ribbons one from another.

By stacking and cementing together the initially cemented segments 38 of a plurality of ribbons 16, a fiberscope body 44 (FIG. 6) may be produced. A cut transversely through body 44 along line 7—7 will then form identically geometrically patterned end faces 46 of the fiberscope; one such face is illustrated in FIG. 7.

It is pointed out that ribbons 16 are simply, quickly and accurately formed without complicated and expensive level winding apparatuses and/or the need for hand packing of their convolutions. They are immediately adaptable to stacking and cementing together in side-by-side relationship as complete fiberscope bodies without problems of interfitting one within another or particular concern with alignment of helix angle of their convolutions.

I claim:
1. The method of making endless ribbons of optical fiber for use in the fabrication of coherent fiberscopes comprising, in each case, the steps of:
   winding in one direction a continuous length of a light-conducting fiber into a plurality of convolutions with successively formed convolutions directed against and alternately slightly to one side of each other throughout corresponding relatively short sections of their respective lengths and with remaining lengths of said convolutions randomly closely bundled together;
   bringing said short sections of said convolutions into accurately aligned relationship with each other; and
   cementing said convolutions together across said aligned short sections thereof.

2. The method according to claim 1 wherein said sections of said convolutions are positioned between parallel stacking plates with said plates initially being spaced a distance apart greater than the diameter of said fiber but less than two diameters of said fiber and said sections are aligned by moving said stacking plates one toward another sufficiently to close said space therebetween to a width of approximately the diameter of said fiber.

3. The method according to claim 1 wherein said remaining lengths of said convolutions are bundled together by winding same in sections of troughs.

4. The method according to claim 1 wherein a plurality of said ribbons are wound in spaced succession along winding means from said continuous length of fiber by leading said fiber from one ribbon winding position to another and the fiber is severed between each ribbon of said succession of windings to separate said ribbons from one another.

* * * * *